(12) United States Patent
Seibert et al.

(10) Patent No.: US 7,792,225 B2
(45) Date of Patent: Sep. 7, 2010

(54) METHOD AND DEVICE FOR REDUCING CROSS-CORRELATION FALSE ALARMS IN CDMA AND OTHER WIRELESS NETWORKS

(75) Inventors: Cristina A. Seibert, Mountain View, CA (US); Michael James Wengler, Carlsbad, CA (US); Roland Reinhard Rick, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 712 days.

(21) Appl. No.: 11/564,772

(22) Filed: Nov. 29, 2006

(65) Prior Publication Data
US 2007/0195866 A1 Aug. 23, 2007

Related U.S. Application Data (60) Provisional application No. 60/741,337, filed on Nov. 30, 2005.

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. .................. 375/346; 375/316; 375/148; 375/147

(58) Field of Classification Search ................ 375/346, 375/316, 147, 148
See application file for complete search history.

(56) References Cited

U.S. PATENT DOCUMENTS

| 6,493,376 | B1 * | 12/2002 | Harms et al. ............... 375/130 |
| 7,139,305 | B2 * | 11/2006 | Gavnoudias et al. ........ 375/147 |
| 2003/0128747 | A1 | 7/2003 | Poon et al. | |

FOREIGN PATENT DOCUMENTS

EP   1316811   6/2003

OTHER PUBLICATIONS

International Search Report-PCT/US06/061439, International Search Authority-European Patent Office-Sep. 11, 2007.
Written Opinion-PCT/US06/061439, International Search Authority-Munich-Sep. 11, 2007.
International Preliminary Report On Patentability-PCT/US06/061439, International Search Authority-European Patent Office-Jun. 3, 2008.

* cited by examiner

*Primary Examiner*—Ted M Wang
(74) *Attorney, Agent, or Firm*—Andrea L. Mays; Shyam K. Parekh (57) ABSTRACT

A method and device for combating cross-correlation false alarms by introducing code diversity in the correlation process in which the search code may be diversified by the use of code staggering and/or code scrambling. The energy levels of the signals before and after the search code have been diversified may be evaluated to detect a false alarm. In addition, a set of parameterized analytical models may be used to estimate the rate of false alarms from cross-correlation in wireless networks in order to guide development and design of wireless transceivers.

32 Claims, 11 Drawing Sheets

FIGURE 11

METHOD AND DEVICE FOR REDUCING CROSS-CORRELATION FALSE ALARMS IN CDMA AND OTHER WIRELESS NETWORKS

CROSS-REFERENCE TO RELATED APPLICATIONS

This application claims priority under 35 U.S.C. §119(e) to provisional U.S. Patent Application No. 60/741,337, filed on Nov. 30, 2005, assigned to the assignee hereof, the disclosure of which is expressly incorporated by reference herein in its entirety.

BACKGROUND

1. Field

The present method and device is directed generally to reducing cross-correlation false alarms in devices connecting to wireless networks, and more particularly, to a device and method for reducing cross-correlation false alarms in devices connecting to networks employing code division multiplexing, receiving satellite positioning system signals, and similar techniques.

2. Background

Many devices such as mobile stations (MS) and wireless base stations operate in wireless networks employing wireless communication protocols such as CDMA or operate employing satellite positioning system signals. These devices receive signals from various transmitting sources. These transmitting sources can present to the MS or the base station (wireless receiver) where they are to be individually detected and processed by the wireless receiver. Each of the transmitting sources code their transmission signal with an individual code to distinguish it from other signals from other transmitting sources. Each wireless receiver can then correlate the received signal from the transmitting source against a full or partial set of codes associated with wireless transmitters in that network. The wireless receiver will typically thereafter try to obtain a match for a particular code. When a match for a code is found, the transmitting source with the code is detected.

However, often times in the presence of noise and due to imperfect codes, matches in the correlation process from a transmitting source may occur even in the absence of a real signal or code at the wireless transceiver. When a wireless receiver determines a match in the search process that occurs based on noise at the wireless receiver without a real transmission from a transmitting source, the wireless reception is referred to as a cross-correlation false alarm.

For example, if a wireless receiver looking to receive a signal from a transmitting source having a code C1, a match in the correlation process may occur for some undesired signal having a code C2 in the absence of the desired signal having code C1. This match is due to a cross-correlation between code C1 and C2. Again, the resulting error is referred to as cross-correlation false alarm.

In the past, various techniques have been typically employed to reduce the occurrence of false alarms in wireless receivers, such as energy thresholds and redundant searches. These techniques have been used either individually or in combination to attempt to reduce the number of false alarms.

In the case of the energy threshold technique, the assumption is that the majority of false alarms due to noise or cross-correlation generally fall below some wireless signal energy level. Accordingly, the wireless receiver will typically only determine a match in the correlation process when the energy of the resulting correlation of the wireless signal that is received in the wireless receiver is above some predetermined energy threshold. A careful selection of the wireless signal energy threshold must be made so as to maximize the probability of detecting a real wireless transmission, such as real pilots at weak energy levels, while also minimizing the probability of detecting noise in cross-correlation false alarms.

Another known technique to address the cross-correlation false alarm problem is the use of redundant wireless signal searches. Redundant searches rely on the assumption that some independence exists between subsequent wireless signal searches. This independence typically decreases the probability of detecting false alarms with each additional wireless signal search.

For example, existing redundant search implementations allow for some independence between searches through time diversity. This relies on the assumption that noise is typically time-varying. Accordingly, searches at different points and times can typically be considered independent with respect to the noise. Thus, for typical noise functions, the probability of false alarms due to noise will decrease over time such as in an exponential fashion with subsequent searches.

However, it is been found that the energy threshold technique and the redundant search technique do not provide satisfactory prevention of cross-correlation false alarms. Cross-correlations are mainly a by-product of code properties and are not generally independent of time. Accordingly, there is a need for techniques that do not rely solely on time diversity or an energy threshold in order to benefit from cross-correlation independence.

Additionally, models for estimating the rate of cross-correlation false alarms described above in wireless networks may help in the design, development, and improvement of wireless networks. However, no current satisfactory model exists to estimate the rate of cross-correlation false alarms. Accordingly, there also is a need for an analytical model to help estimate the rate of false alarms from cross-correlation in wireless networks and more particularly, CDMA networks or satellite positioning systems.

SUMMARY

The method and device herein meets the foregoing needs and avoids the disadvantages and drawbacks of the prior art by providing a device and method for combating cross-correlation false alarms. The cross-correlation false alarms may be reduced by introducing code diversity in the correlation process. For example, the search code may be diversified by the use of code staggering and/or code scrambling. The energy levels of the signals before and after the search code has been diversified may be evaluated to detect a false alarm. The code diversity increases independence among subsequent searches and thus decreases the probability of false alarms from cross-correlation.

The method and device may also provide a set of parameterized analytical models to estimate the rate of false alarms from cross-correlation in wireless networks in order to guide development and design of wireless transceivers.

Accordingly, in one aspect, a method of reducing wireless cross-correlation false alarms includes the steps of searching a received wireless signal using a search code, determining an energy of the wireless signal associated with the search code, diversifying the search code and searching the wireless signal using the diversified search code, determining an energy of the received wireless signal associated with the diversified search code, and evaluating the energy of the received signal associated with the search code and the energy of the received wireless signal associated with the diversified search code to determine if the wireless signal is a false alarm.

The step of diversifying may include at least one of staggering the search code and scrambling the search code. Staggering the search code may include offsetting the search code and the received wireless signal by a predetermined amount, which may include a half-slot. The step of scrambling the search code may include one of an arithmetic series, geometric series, or random based series scrambling. The step of evaluating the energy of the received signal associated with the search code and the energy of the received wireless signal associated with the diversified search code to determine if the wireless signal is a false alarm further may include determining whether both the energy of the received signal associated with the search code and the energy of the received wireless signal associated with the diversified search code exceed a threshold. The step of determining an energy of the received wireless signal may include multiplying the search code with a complex conjugate of the received wireless signal to generate a first outcome, coherently integrating the first outcome N number of consecutive chips to generate a second outcome, and incoherently adding the second outcome M times. The received wireless signal may include one of CDMA IS-95, cdma2000, Wideband-CDMA (W-CDMA), Universal Mobile Telecommunications System (UMTS) and Satellite Positioning System signals.

According to another aspect, a device to reduce wireless cross-correlation false alarms includes a processor configured to search a wireless signal using a search code, to determine an energy of the wireless signal associated with the search code, to diversify the search code and search the wireless signal using the diversified search code, to determine an energy of the wireless signal associated with the diversified search code, and to evaluate if a cross-correlation false alarm exists based on the energy of the wireless signal associated with the search code and the energy of the wireless signal associated with the diversified search code.

The processor may be configured to diversify the search code by at least one of staggering the search code and scrambling the search code. Staggering the search code may include offsetting the search code and the wireless signal by a predetermined amount, which may include a half-slot. Scrambling the search code may include one of an arithmetic series, geometric series, or random based series scrambling. The processor may be further configured to determine whether both the energy of the received signal associated with the search code and the energy of the received wireless signal associated with the diversified search code exceed a threshold when energy of the received signal associated with the search code and the energy of the received wireless signal associated with the diversified search code is evaluated. The processor may determine the energy of the wireless signal by multiplying the searched code with a complex conjugate of the wireless signal to generate a first outcome, coherently integrating the first outcome N number of consecutive chips to generate a second outcome, and incoherently adding the second outcome M times. The received wireless signal may include one of CDMA IS-95, cdma2000, Wideband-CDMA (W-CDMA), Universal Mobile Telecommunications System (UMTS) and Satellite Positioning System signals.

In yet another aspect, a machine-readable medium includes instructions, which, when executed by a processor reduces wireless cross-correlation false alarms. The instructions include instructions to search a received wireless signal using a search code, instructions to determine an energy of the received wireless signal associated with the search code, instructions to diversify the search code and searching the received wireless signal using the diversified search code, instructions to determine an energy of the received wireless signal associated with the reordered search code, and instructions to evaluate the energy of the wireless signal associated with the search code and the energy of the wireless signal associated with the diversified search code to determine if the wireless signal is a false alarm.

The instructions to diversify the search code may include at least one of instructions to stagger the search code and scramble the search code. The instructions to stagger the search code may include offsetting the search code and the received wireless signal by a predetermined amount, which may include a half-slot. The instructions to scramble the search code may include one of an arithmetic series, geometric series, or random based series scrambling. The instructions to evaluate if the energy of the wireless signal associated with the search code and the energy of the wireless signal associated with the reordered search code to determine if the wireless signal is a false alarm further may include instructions to evaluate if the energy of the wireless signal associated with the search code and the energy of the wireless signal associated with the diversified search code both exceed a threshold. The instructions to determine an energy of the wireless signal may include instructions to multiply the searched code with a complex conjugate of the wireless signal to generate a first outcome, instructions to coherently integrate the first outcome N number of consecutive chips to generate a second outcome, and instructions to incoherently add the second outcome M times. The received wireless signal may include one of CDMA IS-95, cdma2000, Wideband-CDMA (W-CDMA), Universal Mobile Telecommunications System (UMTS) and Satellite Positioning System signals.

In a further aspect, a device to reduce wireless cross-correlation false alarms includes means for searching a received wireless signal using a search code, means for determining an energy of the received wireless signal associated with the search code, means for diversifying the search code and searching the received wireless signal using the diversified search code, means for determining an energy of the received wireless signal associated with the diversified search code, and means for determining if a cross-correlation false alarm exists based upon the energy of the received signal associated with the search code and the energy of the received wireless signal associated with the diversified search code.

The diversifying means may include at least one of means for staggering the search code and means for scrambling the search code. The staggering means may offset the search code and the wireless signal by a predetermined amount, which may include a half-slot. The scrambling means may include scrambling based on one of an arithmetic series, geometric series, or random series. The means for determining an energy of the wireless signal may include multiplying the searched code with a complex conjugate of the wireless signal to generate a first outcome, coherently integrating the first outcome N number of consecutive chips to generate a second outcome, and incoherently adding the second outcome M times. The received wireless signal may include one of CDMA IS-95, cdma2000, Wideband-CDMA (W-CDMA), Universal Mobile Telecommunications System (UMTS) and Satellite Positioning Signals. The means for determining if a cross-correlation false alarm exists further may include determining if the energy of the received signal associated with the search code and the energy of the received wireless signal associated with the diversified search code exceeds a threshold.

In yet another aspect, a method of reducing wireless cross-correlation false alarms includes the steps of transmitting a wireless signal using a code, diversifying the code by scrambling the code, and transmitting the wireless signal using the diversified code. The step of scrambling the code may include one of an arithmetic series, geometric series, or random based series scrambling.

According to another aspect, a method of analyzing cross-correlation false alarms includes the steps of generating, using combinations of Gaussian noise, a pilot sequence at various energy levels and with a random offset, generating a hypothesis sequence at another random offset in a PN sequence, correlating the hypothesis and data sequences and integrating coherently over N chips and incoherently M times, determining if an energy is at or above a threshold, computing, by counting a percentage of cases, where the energy is at or above that threshold to obtain a result and outputting the result to an output device. The method may include the step of repeating the method for T iterations.

According to yet another aspect, a method of analyzing cross-correlation false alarms includes the steps of generating inputs to a Marcum-Q function based on one of a modification in a input noise threshold to account for code cross-correlation properties or an approximation based on a product of Marcum-Q function, measuring an expected cross-correlation false alarm rate using a Marcum-Q function, and outputting the expected cross-correlation false alarm rate to an output device.

Additional features, advantages, and embodiments of the method and device described herein may be set forth or apparent from consideration of the following detailed description, drawings, and claims. Moreover, it is to be understood that both the foregoing summary and the following detailed description are exemplary and intended to provide further explanation without limiting the scope of the method and device as claimed.

BRIEF DESCRIPTION OF THE DRAWINGS

The accompanying drawings, which are included to provide a further understanding of the method and device, are incorporated in and constitute a part of this specification, illustrate embodiments of the method and device and together with the detailed description serve to explain the principles of the method and device. No attempt is made to show structural details of the method and device in more detail than may be necessary for a fundamental understanding of the method and device and the various ways in which it may be practiced. In the drawings.

DETAILED DESCRIPTION

The embodiments of the method and device herein and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the method and device. The examples used herein are intended merely to facilitate an understanding of ways in which the method and device may be practiced and to further enable those of skill in the art to practice the embodiments of the method and device. Accordingly, the examples and embodiments herein should not be construed as limiting the scope of the method and device, which is defined solely by the appended claims and applicable law. Moreover, it is noted that like reference numerals represent similar parts throughout the several views of the drawings.

A first aspect of the method and device is directed to methods for combating cross-correlation false alarms that use wireless signal code diversifying, such as code staggering and wireless signal code scrambling. Both of these methods introduce code diversity in the correlation process, thereby increasing independence among subsequent searches and thus decreasing the probability of false alarms from cross-correlation. The methods are discussed separately, but may be used together.

Cross-correlation false alarms may be reduced by the use of wireless signal code diversifying. An initial search is conducted on a received signal. Thereafter, the received signal and each searched code are diversified to perform a redundant search. As a consequence of this reordering, inputs to coherent and non-coherent integration steps are changed, thus producing energy values that are different from the initial search which are indicative of a cross-correlation false alarm.

Figure 1:
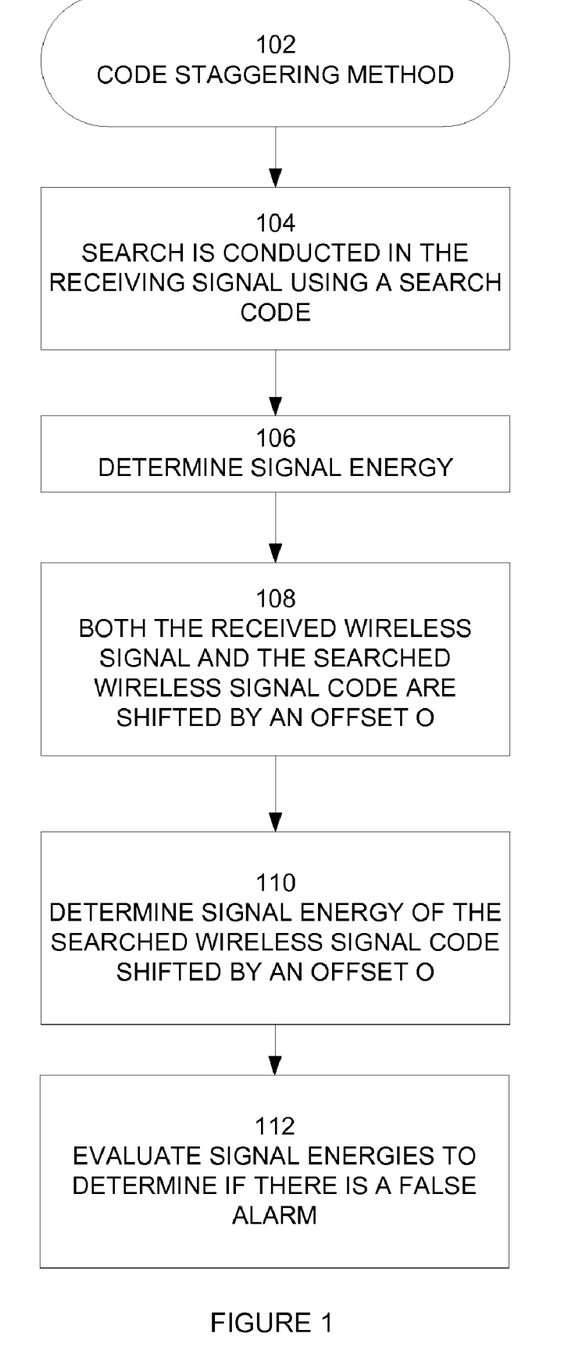
FIG. 1 is a flow chart showing a code staggering method that may be used to mitigate cross-correlation false alarms.

FIG. 1 is a flow chart showing a code staggering method that may be used to mitigate cross-correlation false alarms. More specifically, as shown in FIG. 1, the code staggering method 102 first receives a wireless signal into the device. The device may be a mobile station as defined below. Thereafter as shown in step 104, a search is conducted in the received signal using some search code.

In step 106, the signal energy is determined for the signal associated with the search code. Determining the signal energy may be obtained by multiplying the searched code with a complex conjugate of the received signal. This value may then be coherently integrated across some number N of consecutive chips. The result may be incoherently added M times. The result thereof is the energy of the signal associated with that particular search code. It should be noted that any known type of mathematical process may be used in order to obtain the signal energy of a received wireless signal.

Next, as shown in step 108, both the received wireless signal and the searched wireless signal code are shifted by an offset O. This occurs during a redundant search of the wireless signal.

The offset O may be chosen in such a way as to ensure the most divergence in the input to the integration process. This is achieved when O is set to about N/2, which is half of the coherent integration length. Other values of O may also be employed. For example, O may be set to be about 1024 chips when N is set to be about 2048 chips.

Next, the energy of the wireless signal is again obtained as shown in step 110 in a manner as described above. Finally the signal energy found in step 106 and found in step 110 are evaluated to determine if the searched code is associated with a desired signal or a false alarm in step 112. The evaluation may employ comparing the signal energy found in steps 106 and 110 with a predetermined threshold. Of course other types of evaluation are contemplated with the method and device.

For example, the code staggering method may be applied to a CDMA network where a correlated sequence of chips may be referred to as rc1, rc2, rc3, . . . rc2048, rc2049, . . . , rc32768. In the prior art, both the initial and redundant search, coherently integrated chips <rc1 through rc2048>, then <rc2049 through rc4096>, etc. With the staggered scheme of the method and device, the redundant search may use O as the staggering offset, thus chips <rcO through rc(O+2047)>, <rc(O+2048) rc(O+4095)>, . . . , <rc(32768−2048+O) through rc(O−1)> are coherently integrated.

Figure 7:
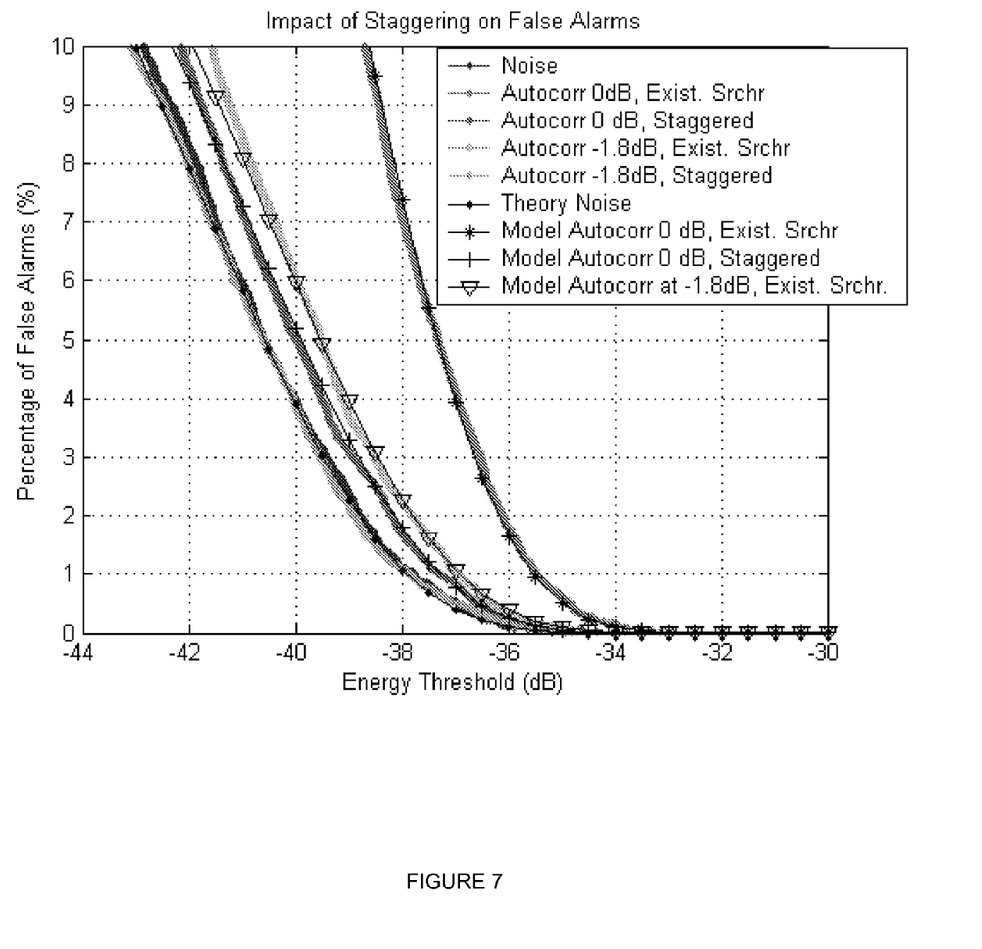
FIG. 7 is a graph of noise and cross-correlation false alarms showing the impact of a staggered search scheme in a wireless network.

The scheme is referred to as "staggered" due to the shift between the initial and redundant searches. The results of using the method and device with the staggered scheme compared to the prior art or original scheme (labeled as "Exist. Srchr") are shown in FIG. 7 using the method discussed below. Moreover, the results for an auto-correlation pilot at 0 dB, which represents a theoretical case not actually achieved in a CDMA-2000 network are shown. The results for an auto-correlation pilot at −1.8 dB, which is the strongest pilot level in a typical CDMA network with the pilot using two third of the transmission power and the paging and sync channels using one third of power and no power being used for traffic, are shown along with the results for noise. Both the auto-correlation and mixed cases improve and approach the noise case.

For an autocorrelation pilot at 0 dB, within some range of interest, the redundant search behaves like an independent search with half the amount of coherent integration. Thus, the rate of auto-correlation false alarms for the staggered case, at some energy E and for a coherent integration parameter N, namely R(E, N) can be written as: $R(N,E)=Q(N,E+A)*Q(N/2,E)$, where $Q(N,E)$ is the noise false alarm rate at threshold E for a single search and a coherent integration parameter N. A may be an empirical combination of N, M, and codes used in the network. For example for N=2048 and M=16, A may be 0.7 for some networks. For N=2048 and M=16, this equation holds for E in the range >~−45 dB. The results for the model are shown in the graph, closely tracking the simulation results for the auto-correlation case.

Figure 8:
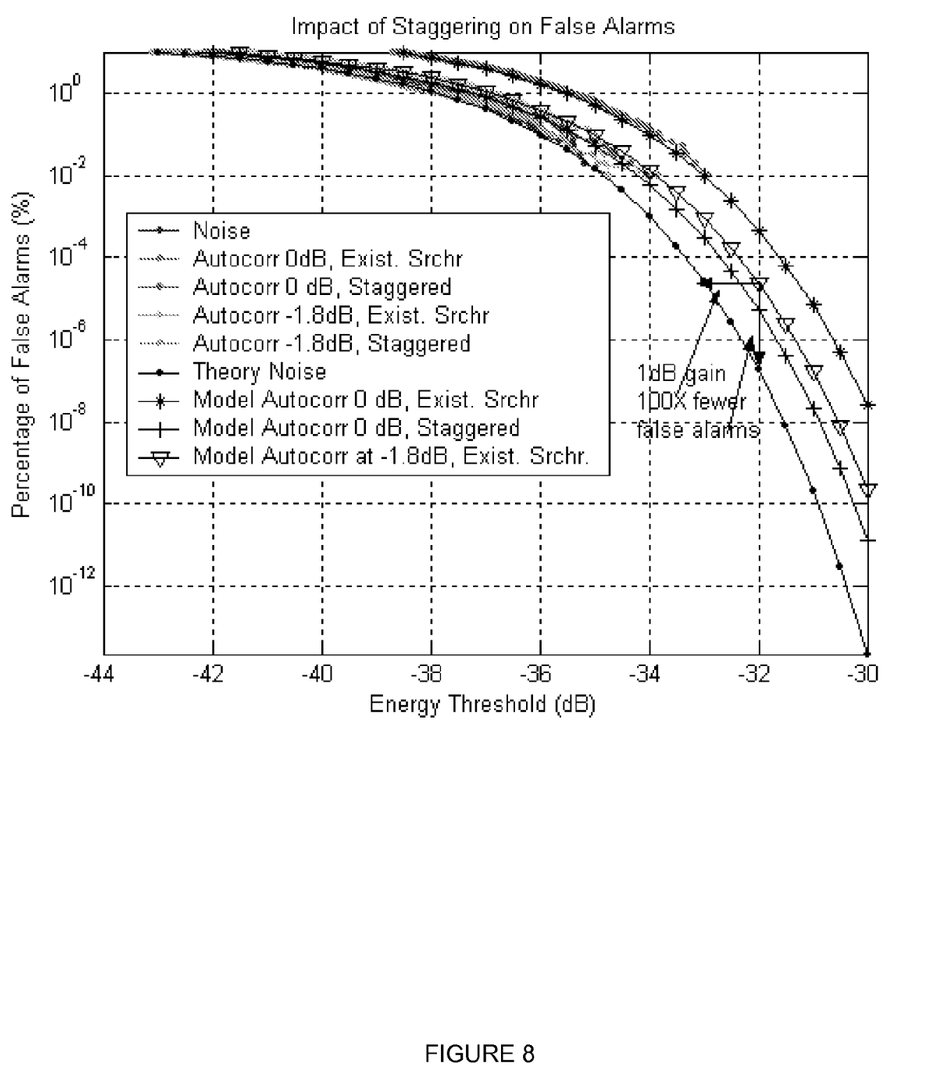
FIG. 8 is a graph of the impact on false alarms showing the impact of staggering in a wireless network on a exponential scale.

FIG. 8 is a graph of the impact on false alarms showing the impact of staggering in a wireless network on an exponential scale and, in particular, depicts the impact of staggering on false alarm rates at high noise thresholds. Notice that in this range, the analytical model becomes the desirable method for quantifying the rate of false alarms, since simulations become prohibitive, requiring large number of random runs. Staggering reduces auto-correlation false alarms by about 100× at −32 dB or conversely, increases the search sensitivity by about 1 dB.

According to another aspect of the method and device, code scrambling to mitigate cross-correlation false alarms is to use code scrambling. As noted above, by varying the inputs to the coherent integration process in the redundant search, the rate of cross-correlation false alarms was reduced. Along the same lines, new sets of correlated chips for coherent integration may be generated that, instead of using the sequentially correlated chips, uses the correlated chips in a scrambled fashion.

Figure 2:
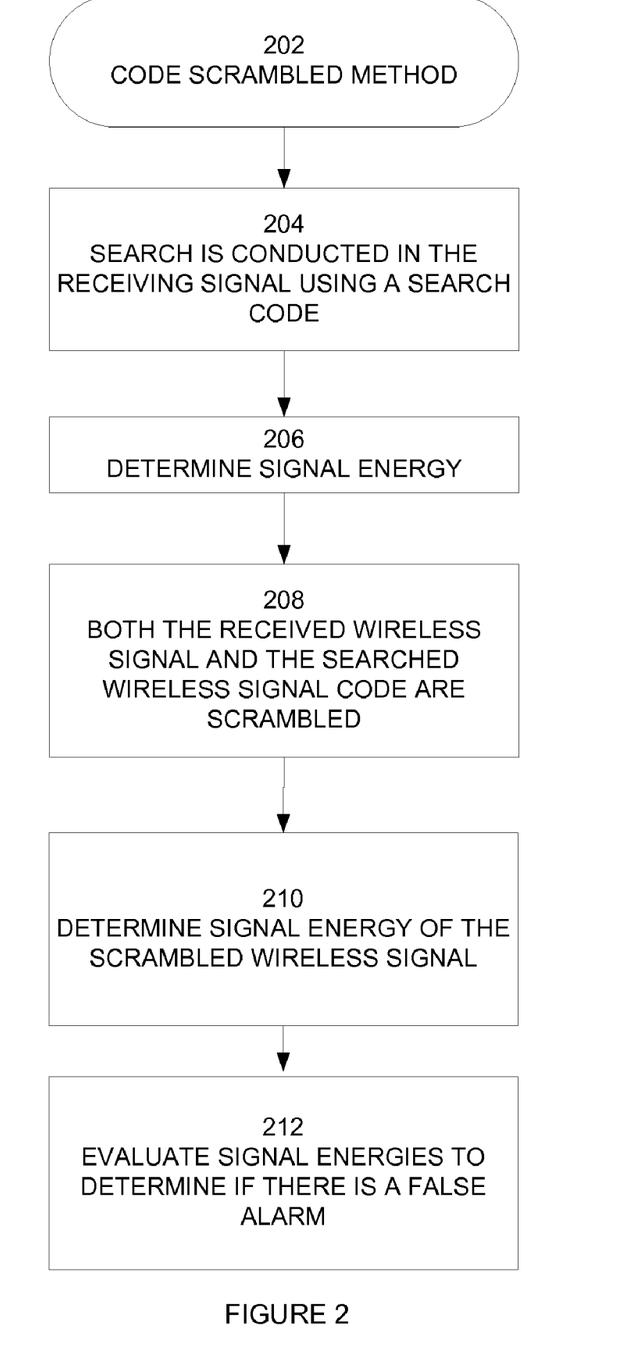
FIG. 2 is a flow chart showing a code scrambling method that may be used to mitigate cross-correlation false alarms.

FIG. 2 is a flow chart showing a code scrambling method 202 that may be used to mitigate cross-correlation false alarms. In particular, as described above, a search of a received signal using a particular search code is conducted in step 204. Next, as shown in step 206 the signal energy from this searched code is obtained. The signal energy may be obtained using any known process or the process described above. Next, at step 208 the received signal is again searched with the search codes scrambled such that they are no longer in a sequential order. In step 210 the signal energy is obtained for the redundant search using the scrambled codes. Finally the signal energies found in step 206 and in step 210 are evaluated to determine if there is a desired signal or a false alarm as noted above.

The scrambling can be done according to any arithmetic series, geometric series, random number based series reordering of the chips or search codes. Moreover, the scrambling can take the form of any known scrambling or reordering of the chips or search codes.

For example, the scramble method may be applied to a CDMA network where a sequence of correlated chips may be referred to as rc1, rc2, rc3, . . . rc2048, rc2049, . . . , rc32768. In the original scheme used in steps 204 and 206 the process coherently integrates chips <rc1 through rc2048>, then <rc2049 through rc4096>, etc. In the staggered scheme, the redundant search may use O as the staggering offset, thus chips <rcO through rc(O+2047)>, <rc(O+2048) rc(O+4095)>, . . . , <rc(32768−2048+O) through rc(O−1)> are coherently integrated. In the scrambled scheme, a scramble factor D may be used and the process coherently integrates <rc1, rc(1+D), rc(1+2D)>, then <rc2, rc(2+D), rc(2+2D)>, etc. In a particular case, D=16, thus the coherent integration is performed on sets: <rc1, rc17, rc33, . . . >, <rc2, rc18, rc34, . . . >, etc. Other values of D may be employed and are fully contemplated by the method and device. Moreover, it should be noted that any type of mathematical re-arrangement or scrambling of the codes is contemplated by the method and device.

Figure 9:
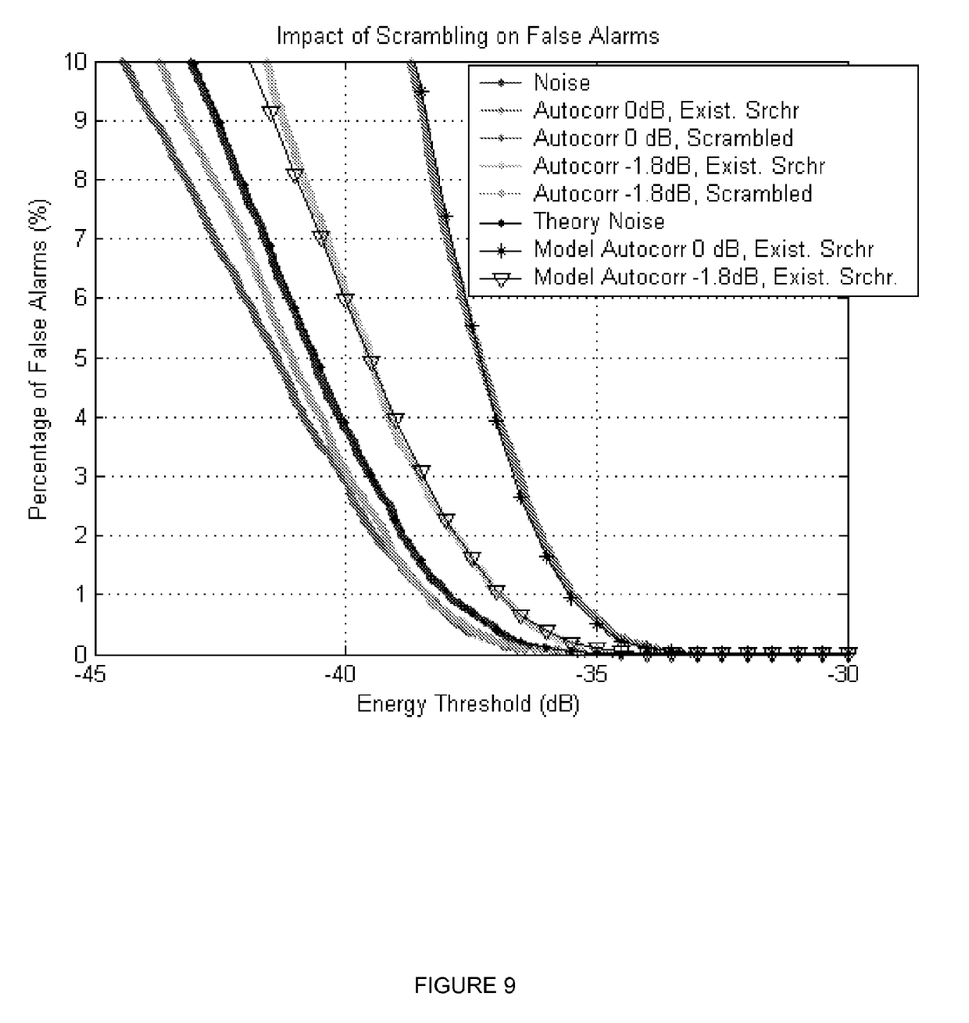
FIG. 9 is a graph of the noise and cross-correlation false alarms showing the impact of a scrambling search scheme in a wireless network.
Figure 10:
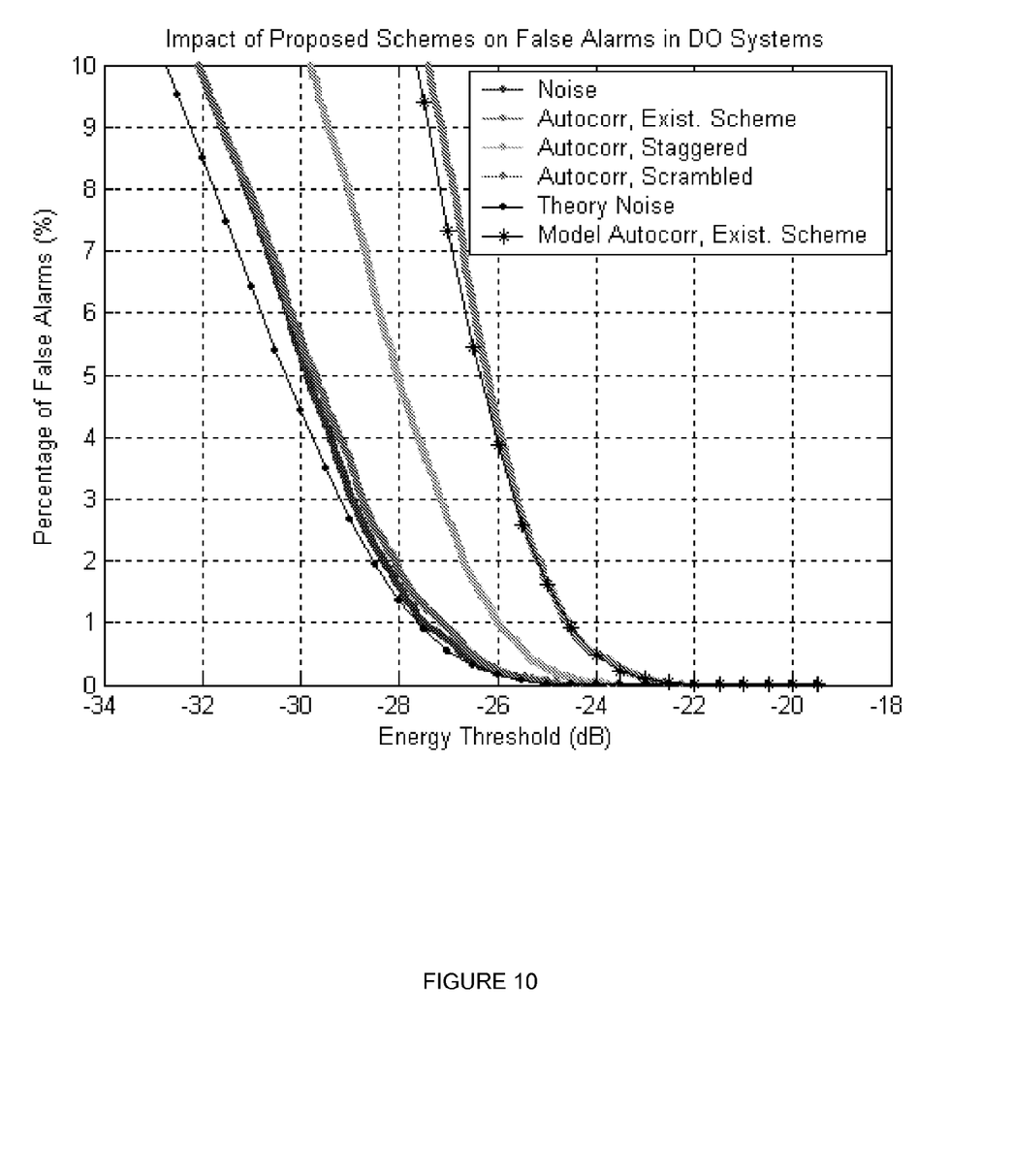
FIG. 10 is a graph of the noise and cross-correlation false alarms showing the impact of using both the staggering and scrambling schemes in a DO network.

The impact on false alarms from using the scrambled scheme is shown in the graphs of FIG. 9 and FIG. 10. The false alarm rate becomes bound by noise and reduced by about 100× compared to the staggered approach.

One issue with the scrambled approach is that by coherently integrating chips that are further apart, the range over which the frequency of the received signal is stable increases compared to the staggered approach. Thus, the scheme does not generally apply well to highly dynamic conditions such as for fast moving vehicles. Also, if the scrambling process is executed at the searcher, the solution may also require additional searcher memory to buffer and rearrange the input to the integration process.

An implementation of the scrambling technique that works better in all conditions, including highly dynamic ones, is to have a secondary pilot broadcast by each base station. This secondary pilot may use a scrambled version of the PN sequence. The searcher would then simply use the primary pilot for the first search and the secondary pilot for the redundant search without any additional scrambling. One issue with this solution, however, is that the network infrastructure would need to change to support this implementation.

FIG. 9 shows a graph of the noise and cross-correlation false alarms with the scrambling scheme in an IS-95/CDMA 2000 system applying the method of FIG. 2 and using the below-noted analytical model.

Figure 11:
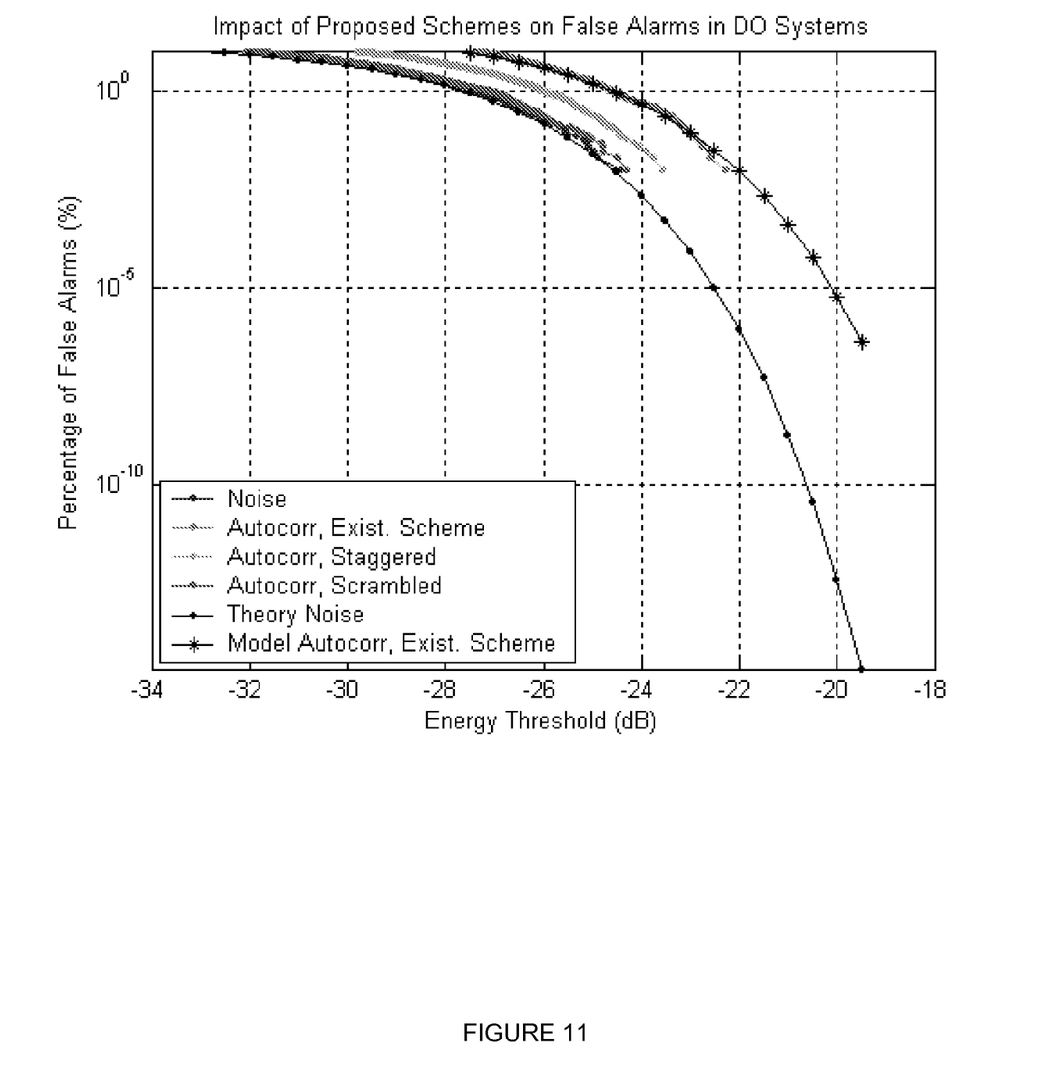
FIG. 11 shows a graph of the impact on false alarms showing the impact of using both staggering and scrambling in a DO network on an exponential scale.

The impact of staggering on mitigating false alarms in a DO network is depicted in FIG. 10 and FIG. 11. A similar gain of 1 dB in sensitivity or a large reduction in auto-correlation false alarms is observed for this scenario. In this system, the staggering offers a 1.5 dB sensitivity gain or, conversely multiple orders of magnitude reduction in false alarms compared to the prior art technique. Scrambling offers a 2.5 dB sensitivity gain or, conversely multiple orders of magnitude reduction in false alarms compared to the existing scheme.

Another aspect of the method and device is directed to using a set of parameterized analytical models to estimate a rate of false alarms from cross-correlation in multiple access networks, such as CDMA IS-95, CDMA 2000 networks, CDMA Data-Only (DO), Universal Mobile Telecommunications System (UMTS), Satellite Positioning System and the like. The analytical model may be used for estimating the rate of cross-correlation false alarms in such networks. The models leverage the simplicity of a Marcum Q function, which is used to estimate the rate of false alarms from noise, and produces results for various searcher implementations and parameter settings.

Multiple access wireless networks, such as CDMA IS-95/CDMA-2000, Universal Mobile Telecommunications System (UMTS), and CDMA Data-Only (DO) systems, and the like have base stations that transmit signals, such as pilot signals, spread with codes. The codes may be derived from a pseudo-random sequence, referred to as a PN sequence. Typically the PN sequence in DO systems is the reverse of the PN sequence used in other systems, such as an IS-95 and a CDMA-2000 system. Both of the above-noted PN sequences exhibit the same properties.

Each base station may use some shifted version of the PN sequence as its code. A wireless transceiver may receive multiple signals, such as pilots, to be detected via cross-correlation of the received signal with a corresponding version of the PN sequence. If a strong signal from one base station, using some code C1 is received in the wireless receiver, and the code C1 has high cross-correlation with some code C2 for a second base station, the signal for that base station may appear to be detected at the wireless receiver even in its absence. This results in a cross-correlation false alarm.

The PN sequence and each code may be complex vectors (e.g., 32768 chips long in some exemplary systems). The correlation process consists of 1) multiplying some searched code with a complex conjugate of the received signal, 2) coherently integrating an outcome of step 1 across some N number of consecutive chips (adding the values from step 1 for N chips and then squaring that sum), and 3) incoherently adding the output of step 2 some number of M times, (adding the output of step 2 for M sets of N chips). For non-limiting discussion purposes only, N and M may have the values of 2048 chips and 16 chips respectively which are common to some wireless protocols. After normalization, the output of step 3 is reported as the energy of the signal associated with the searched code.

For example, a received signal R may be used with a searched code C. When multiplying R a complex conjugate of C, a vector of complex values RC is obtained. The elements in RC may be referred to as rc1, rc2, rc3, etc. The searcher coherently integrates M sets of elements in RC (e.g., <rc1 through rc2048>, <rc2049 through rc4096>, ..., <rc30721 through rc32768> for some wireless protocols). Finally, the M output values are summed, normalized and reported.

Pilot signals are typically continuous in nature some systems, such as in an IS-95 System, CDMA-2000 system, and the like, but bursty in nature in other systems, such as a DO system. Each succession of N/2 chips may be referred to as a half-slot. In each half slot, only a limited number of chips (e.g., 465 through 559 in some wireless protocols) are used to transmit a pilot in a DO system, while the remaining chips are effectively masked out. Due to these differences in design, we analyze and depict the results for each system separately below.

In simulations, the PN sequence is imported and used in IS-95 network, CDMA-2000 network and the like. For DO simulations, this sequence is reversed and mask out some of the chips (e.g., [1:464]) and [560:1024] of every half slot (1024 chip set)).

Figure 3:
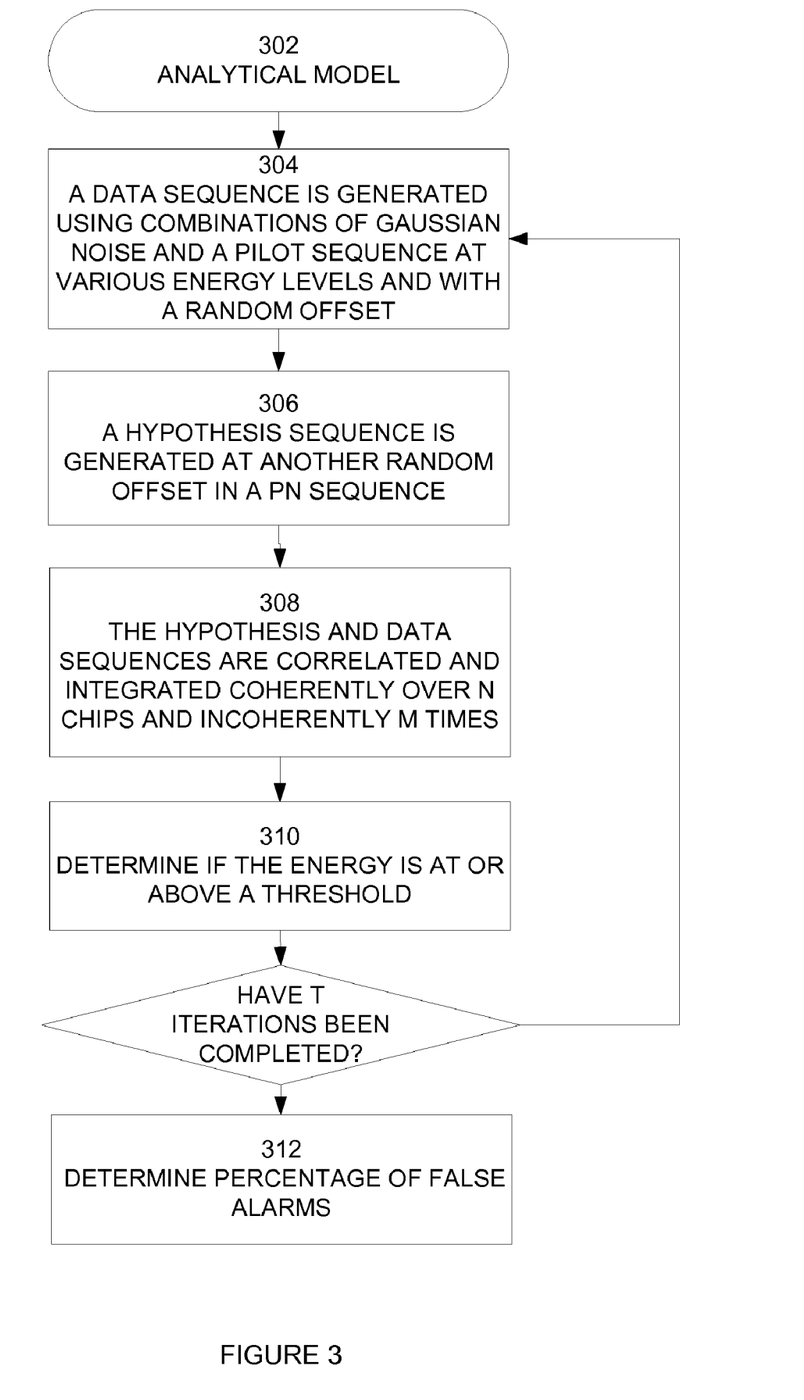
FIG. 3 is a flow chart showing an analytical modeling method that may be used for estimating cross-correlation false alarms.

The analytical model 302, shown in FIG. 3, is repeated for T iterations, (e.g., with e.g., T=10000) using of the following steps:

1. A data sequence is generated, using combinations of Gaussian noise and a pilot sequence, at various energy levels and with a random offset as shown in step 304.

2. A hypothesis sequence is also generated at another random offset in a PN sequence as shown in step 306.

3. In step 308, the hypothesis and data sequences are correlated and integrated coherently over N chips and incoherently M times (where e.g., N=2048 and M=16).

4. Finally, it is determined if the energy is at or above a threshold as shown in step 310. The process is then repeated for T iterations as noted above.

The false alarm rate for a given energy threshold, may be computed by counting a percentage of cases where the computed energy is at or above that threshold following T iterations as shown in step 312. Assuming T is large enough, this is the same as the false alarm for a single hypothesis, multiplied by 100 (since shown as a percentage). Thus, the value may be interpreted as the false alarm rate for a 100 hypothesis search for a given PN.

In this analysis, proven equations using the Marcum Q function are employed to verify the probability of noise false alarms derived from simulation. In addition, parameterized analytical models to fit the probability of false alarms from cross-correlation. The reason for the model is rooted in the need to estimate false alarm rates at thresholds of interest where simulations require a very large number of iterations T>>10 k. The new models use noise equations with adjusted integration parameters and/or energy threshold, as derived through simulation. For example, the analytical model of measuring the expected cross-correlation false alarm rate may be used with the Marcum-Q function with modifications on how inputs are generated. For single searches without a redundant search, a traditional Marcum-Q noise model may be used, but with a modification in the input noise threshold to account for the code cross-correlation properties. For cases where code diversity is also used, an approximation based on a product of Marcum-Q functions is used FIG. 6 further depicts the rate of noise and cross-correlation (auto-correlation) false alarms in an IS-95/CDMA 2000 system, for a simple searcher with no redundant searches. The "auto-correlation" case corresponds to a strong signal at the receiver at an energy level of 0 dB, which represents the case where the input to the receiver consists entirely of the coded signal from the strong source.

Figure 6:
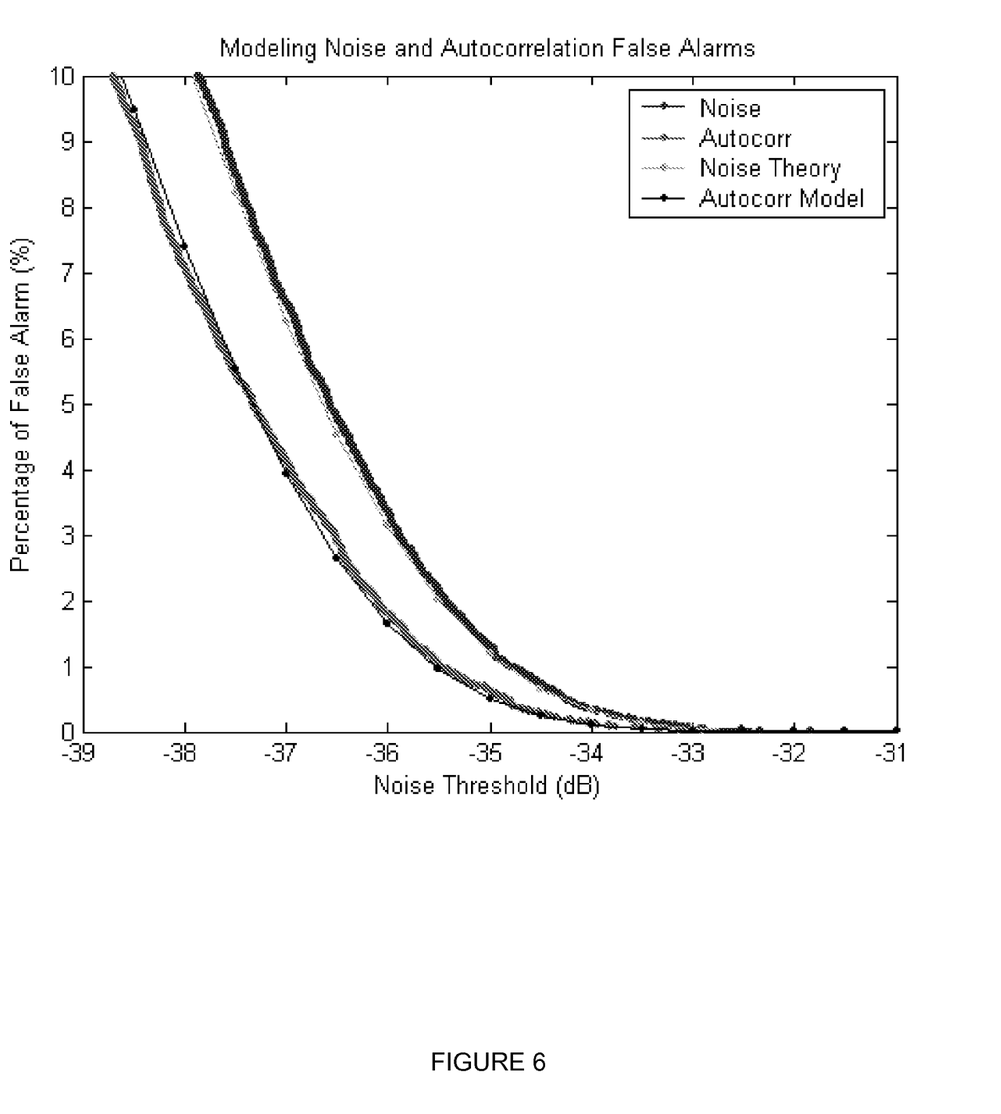
FIG. 6 is a graph of noise and cross-correlation false alarm rates for a simple conventional searcher circuit in a wireless network.

FIG. 6 shows that the noise false alarms dominating cross-correlation false alarms at each noise threshold by generally a few-fold. FIG. 6 also depicts results for 1) an existing theoretical model for estimating the rate of noise false alarms and 2) a parameterized model of the method and device for estimating the rate of auto-correlation false alarms.

To obtain the model, empirical observations are made that the rate of auto-correlation false alarms for a single search and for a given noise threshold E approaches the rate of noise false alarms at a noise threshold of E+A, for some range in E that is of interest.

It may be shown that when a random sequence is used instead of the PN sequence, the auto-correlation false alarm rate at a noise threshold E is the same as the noise false alarm rate at E. Therefore, the need for A is a direct result of the auto-correlation properties of the PN sequence which add additional protection against auto-correlations. The value for A depends on the values for N and M and the noise threshold. For the search parameters used and noise threshold range of interest, an estimate for A is about 0.7 dB for many applications.

Formally, the rate of auto-correlation false alarms at some noise threshold E, namely $R(E)$ may be written as:

$R(E)=Q(E+0.7)$ where $Q(E)$ is the noise false alarm rate at a noise threshold E, for E in the range $>\sim-45$ dB.

In prior art schemes, in a given search cycle, two redundant searches may be performed for a given code, using the signal samples received at different times, to allow for time diversity and thus the mitigation of noise false alarms. We will refer to the second search as the redundant search.

When a weak pilot signal is detected in a deep search, a second deep search is performed using a data sequence at what may be the same offset as in the first search. If a hypothesis produces a match in the second search, and is within Wr (Wr being the window in chips by which outcomes of the initial and diversity search are permitted to differ, to allow for factors such as fading) chips from where the first search produced a match, the pilot signal is considered found. A redundant search is said to be strict when Wr equals 0 and relaxed when Wr>0.

The analytical model may be enhanced to simulate redundant detection. Two consecutive searches may be performed for a given data sequence and hypothesis. The false alarm rate at a given energy threshold may be computed as the percentage of cases where the computed energies for a given hypothesis are at or above that threshold in both consecutive searches.

Since the rate of false alarms is very small in the range of interest, the reported false alarm rate can be interpreted as the rate of false alarms per pilot for a double-detection search with 100 hypotheses and strict detection, or a 20-hypothesis relaxed double detection search with Wr of 2. To compute the false alarm rate for different window sizes and Wr values, one may generally adjust the rate by the change in window sizes and Wr values.

The result of the modeling shows that the probability of a noise false alarm for a single hypothesis is essentially squared. However, compared to the single detection case, autocorrelation false alarms may remain largely unmitigated since autocorrelation peaks line up at the same offsets between the two searches. In fact, for an autocorrelation pilot at E dB (other than 0), the second detection may be modeled as an independent search using the noise equation with a coherent integration length reduced by $1/(1-10^{\wedge}(E/10))$.

For example, with pilots at 20%, paging and sync at 10% and no traffic in a CDMA-2000 network, the strongest auto-correlation peak is at −1.8 dB. Thus the second detection can be modeled as an independent search using the noise equations with N/3 coherent integration.

Accordingly, the analytical model 302 shown in FIG. 3 provides insight to the relationship of the autocorrelation false alarms with respect to various different techniques used to mitigate the same. Of course other applications and uses are considered within the spirit and scope of the method and device with this analytical model.

Figure 4:
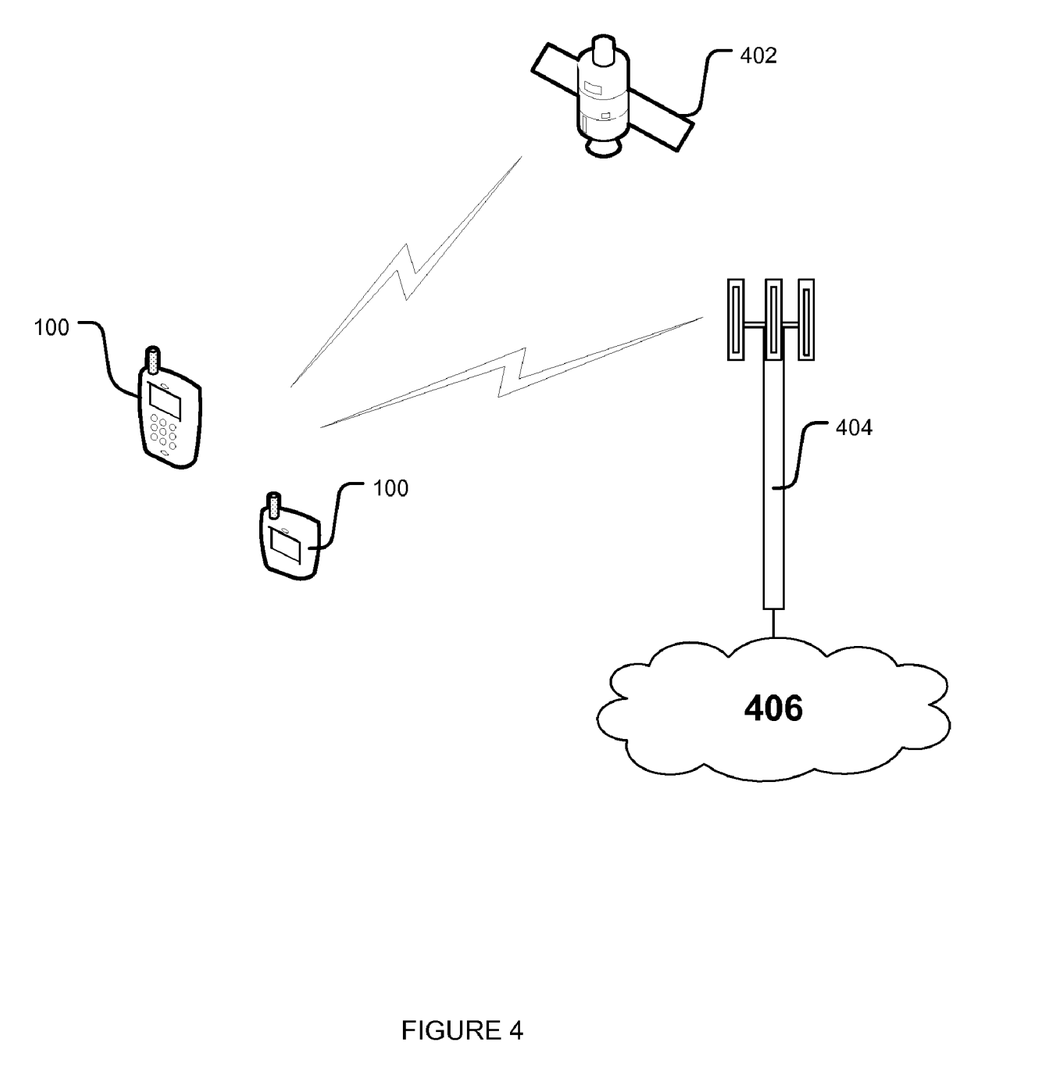
FIG. 4 is a schematic diagram showing an implementation of two different exemplary mobile stations together in a satellite and/or cellular system constructed according to the principles of the method and device described herein.

The cross-correlation reduction methods, including signal processing and acquisition, of the method and device may be used for various wireless communication networks 406 such as those associated with an antenna 404 shown in FIG. 4 for use with various mobile stations 100, such as a wireless wide area network (WWAN), a wireless local area network (WLAN), a wireless personal area network (WPAN), and so on. As used herein, mobile station (MS) 100 refers to a device such as a cellular telephone, wireless communication device, user equipment, other personal communication system (PCS) device, a position determination device employing position determination techniques or the like. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Universal Mobile Telecommunications System (UMTS), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

As further shown in FIG. 4, the mobile station 100, 100 may receive signals from satellite(s) 402, which may be from a Global Positioning System (GPS), Galileo, GLONASS, NAVSTAR, GNSS, a system that uses satellites from a combination of these systems, or any SPS developed in the future, each referred to generally herein as a Satellite Positioning System (SPS). As used herein, an SPS will also be understood to include pseudolite systems.

The methods and apparatus described herein may be used with various satellite positioning systems (SPS), such as the United States Global Positioning System (GPS), the Russian Glonass system, the European Galileo system, any system that uses satellites from a combination of satellite systems, or any satellite system developed in the future. Furthermore, the disclosed methods and apparatus may be used with positioning determination systems that utilize pseudolites or a combination of satellites and pseudolites. Pseudolites are groundbased transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite" as used herein, is intended to include pseudolites, equivalents of pseudolites, and possibly others. The term "SPS signals" as used herein, is intended to include SPS-like signals from pseudolites or equivalents of pseudolites.

Figure 5:
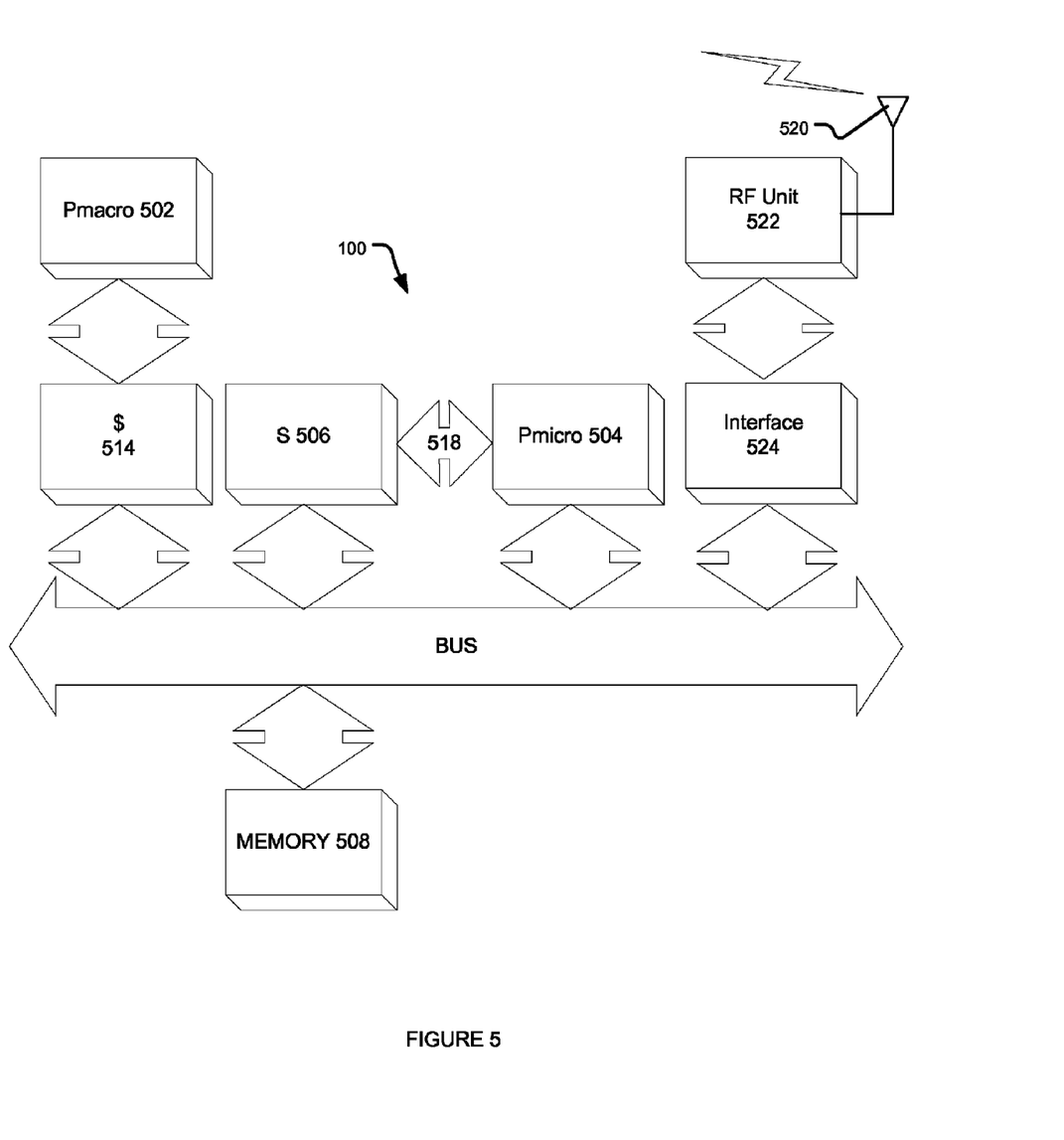
FIG. 5 is a schematic diagram of an exemplary circuit having a custom micro-controller controlling specialized hardware blocks executing digital signal detection and searching algorithms in accordance with the principles of the method and device described herein.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For example, FIG. 5 shows special-purpose hardware blocks S 506 controlled by a custom micro-controller Pmicro 504. Such custom micro-controllers are generally referred to as digital signal processing (DSP) processors, modems, modem DSPs, processors, search engines, or the like. The MS 100 may include a general-purpose processor such as Pmacro 502 to provide control signals to or control of Pmicro 504 via bus/memory interface 514. The control of the special-purpose hardware blocks S 506 by Pmicro 504 is via an interface. The MS 100 may include an antenna 520 to receive a wireless signal. The wireless signal may be any of the radio access technologies (RATs) described above. The wireless signal may be received into a radio frequency (RF) unit 522 in a manner well known in the art. An interface 524 as shown in FIG. 5 may be responsive to the radio frequency unit 522. The interface 524 may include one or more components shown or not shown to process the wireless signal as is well known in the art.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory 508 of ms 100, and executed by a processor, for example the general-purpose processor 504 as shown in FIG. 5. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

While the method and device has been described in terms of exemplary embodiments, those skilled in the art will recognize that the method and device can be practiced with modifications in the spirit and scope of the appended claims. These examples given above are merely illustrative and are not meant to be an exhaustive list of all possible designs, embodiments, applications or modifications of the method and device.

What is claimed:

1. A method of reducing wireless cross-correlation false alarms comprising the steps of:
    searching a received wireless signal using a search code;
    determining an energy of the wireless signal associated with the search code;
    diversifying the search code and searching the wireless signal using the diversified search code;
    determining an energy of the received wireless signal associated with the diversified search code; and
    evaluating the energy of the received signal associated with the search code and the energy of the received wireless signal associated with the diversified search code to determine if the wireless signal is a false alarm.

2. The method according to claim 1 wherein said step of diversifying comprises at least one of staggering the search code and scrambling the search code.

3. The method according to claim 2 wherein staggering the search code comprises offsetting the search code and the received wireless signal by a predetermined amount.

4. The method according to claim 3 wherein the predetermined amount comprises a half-slot.

5. The method according to claim 2 wherein said step of scrambling the search code comprises one of an arithmetic series, geometric series, or random based series scrambling.

6. The method according to claim 1 wherein the step of evaluating the energy of the received signal associated with the search code and the energy of the received wireless signal associated with the diversified search code to determine if the wireless signal is a false alarm further comprises determining whether both the energy of the received signal associated with the search code and the energy of the received wireless signal associated with the diversified search code exceed a threshold.

7. The method according to claim 1 wherein said step of determining an energy of the received wireless signal comprises:
    multiplying the search code with a complex conjugate of the received wireless signal to generate a first outcome;
    coherently integrating the first outcome N number of consecutive chips to generate a second outcome; and
    incoherently adding the second outcome M times.

8. The method according to claim 1 wherein the received wireless signal comprises one of CDMA 15-95, cdma2000, Wideband-CDMA (W-CDMA), Universal Mobile Telecommunications System (UMTS) and Satellite Positioning System signals.

9. A device to reduce wireless cross-correlation false alarms, said device comprising:
    a processor configured to search a wireless signal using a search code;
    said processor configured to determine an energy of the wireless signal associated with the search code;
    said processor configured to diversify the search code and search the wireless signal using the diversified search code;
    said processor configured to determine an energy of the wireless signal associated with the diversified search code; and
    said processor configured to evaluate if a cross-correlation false alarm exists based on the energy of the wireless signal associated with the search code and the energy of the wireless signal associated with the diversified search code.

10. The device according to claim 9 wherein said processor is configured to diversify the search code by at least one of staggering the search code and scrambling the search code.

11. The device according to claim 10 wherein staggering the search code comprises offsetting the search code and the wireless signal by a predetermined amount.

12. The device according to claim 11 wherein said predetermined amount comprises a half-slot.

13. The device according to claim 9 wherein scrambling the search code comprises one of an arithmetic series, geometric series, or random based series scrambling.

14. The device according to claim 9 wherein the processor is further configured to determine whether both the energy of the received signal associated with the search code and the energy of the received wireless signal associated with the diversified search code exceed a threshold when energy of the received signal associated with the search code and the energy of the received wireless signal associated with the diversified search code is evaluated.

15. The device according to claim 9 wherein said processor determines the energy of the wireless signal by multiplying the searched code with a complex conjugate of the wireless signal to generate a first outcome; coherently integrating the first outcome N number of consecutive chips to generate a second outcome; and incoherently adding the second outcome M times.

16. The device according to claim 9 wherein the received wireless signal comprises one of CDMA IS-95, cdma2000, Wideband-CDMA (W-CDMA), Universal Mobile Telecommunications System (UMTS) and Satellite Positioning System signals.

17. A machine-readable medium comprising instructions, which, when executed by a processor reduces wireless cross-correlation false alarms, the instructions comprising:
   instructions to search a received wireless signal using a search code;
   instructions to determine an energy of the received wireless signal associated with the search code;
   instructions to diversify the search code and searching the received wireless signal using the diversified search code;
   instructions to determine an energy of the received wireless signal associated with the reordered search code; and
   instructions to evaluate the energy of the wireless signal associated with the search code and the energy of the wireless signal associated with the diversified search code to determine if the wireless signal is a false alarm.

18. The machine-readable medium according to claim 17 wherein the instructions to diversify the search code comprises at least one of instructions to stagger the search code and scramble the search code.

19. The machine-readable medium according to claim 18 wherein the instructions to stagger the search code comprises offsetting the search code and the received wireless signal by a predetermined amount.

20. The machine-readable medium according to claim 19 wherein the predetermined amount comprises a half-slot.

21. The machine-readable medium according to claim 18 wherein the instructions to scramble the search code comprises one of an arithmetic series, geometric series, or random based series scrambling.

22. The machine-readable medium according to claim 17 wherein the instructions to evaluate if the energy of the wireless signal associated with the search code and the energy of the wireless signal associated with the reordered search code to determine if the wireless signal is a false alarm further comprises instructions to evaluate if the energy of the wireless signal associated with the search code and the energy of the wireless signal associated with the diversified search code both exceed a threshold.

23. The machine-readable medium according to claim 17 wherein the instructions to determine an energy of the wireless signal comprise:
   instructions to multiply the searched code with a complex conjugate of the wireless signal to generate a first outcome;
   instructions to coherently integrate the first outcome N number of consecutive chips to generate a second outcome; and
   instructions to incoherently add the second outcome M times.

24. The machine-readable medium according to claim 17 wherein the received wireless signal comprises one of CDMA IS-95, cdma2000, Wideband-CDMA (W-CDMA), Universal Mobile Telecommunications System (UMTS) and Satellite Positioning System signals.

25. A device to reduce wireless cross-correlation false alarms, said device comprising:
   means for searching a received wireless signal using a search code;
   means for determining an energy of the received wireless signal associated with the search code;
   means for diversifying the search code and searching the received wireless signal using the diversified search code;
   means for determining an energy of the received wireless signal associated with the diversified search code; and
   means for determining if a cross-correlation false alarm exists based upon the energy of the received signal associated with the search code and the energy of the received wireless signal associated with the diversified search code.

26. The device according to claim 25 wherein said diversifying means comprises at least one of means for staggering the search code and means for scrambling the search code.

27. The device according to claim 26 wherein said staggering means offsets the search code and the wireless signal by a predetermined amount.

28. The device according to claim 27 wherein the predetermined amount comprises a half-slot.

29. The device according to claim 26 wherein said scrambling means comprises scrambling based on one of an arithmetic series, geometric series, or random series.

30. The device according to claim 25 wherein said means for determining an energy of the wireless signal comprises:
   multiplying the searched code with a complex conjugate of the wireless signal to generate a first outcome;
   coherently integrating the first outcome N number of consecutive chips to generate a second outcome; and
   incoherently adding the second outcome M times.

31. The device according to claim 25 wherein the received wireless signal comprises one of COMA IS-95, cdma2000, Wideband-CDMA (W-CDMA), Universal Mobile Telecommunications System (UMTS) and Satellite Positioning Signals.

32. The device according to claim 25 wherein means for determining if a cross-correlation false alarm exists further comprises determining if the energy of the received signal associated with the search code and the energy of the received wireless signal associated with the diversified search code exceeds a threshold.

* * * * *